US012496713B2

United States Patent
Lee et al.

(10) Patent No.: US 12,496,713 B2
(45) Date of Patent: Dec. 16, 2025

(54) AUTONOMOUS AND SEMI-AUTONOMOUS MULTIFUNCTIONAL MEDICAL ROBOTS, TEAMS AND SYSTEMS

(71) Applicant: Planned Systems International, Inc., Arlington, VA (US)

(72) Inventors: June Lee, North Bethesda, MD (US); Thomas J Berti, Lusby, MD (US); Yan Li, Bethesda, MD (US)

(73) Assignees: Planned Systems International, Inc., Arlington, VA (US); National Society of Medical Scientists, Bethesda, MD (US)

( * ) Notice: Subject to any disclaimer, the term of this patent is extended or adjusted under 35 U.S.C. 154(b) by 707 days.

(21) Appl. No.: 17/870,621

(22) Filed: Jul. 21, 2022

(65) Prior Publication Data

US 2023/0398685 A1    Dec. 14, 2023

Related U.S. Application Data (63) Continuation-in-part of application No. 17/836,264, filed on Jun. 9, 2022, now Pat. No. 12,283,378.

(60) Provisional application No. 63/390,816, filed on Jul. 20, 2022.

(51) Int. Cl.
| | | |
|---|---|---|
| B25J 9/16 | (2006.01) | |
| A61B 34/10 | (2016.01) | |
| B25J 9/08 | (2006.01) | |
| G16H 20/10 | (2018.01) | |
| G16H 20/40 | (2018.01) | |
| A61B 34/32 | (2016.01) | |

(52) U.S. Cl.
CPC ............ *B25J 9/1656* (2013.01); *A61B 34/10* (2016.02); *B25J 9/08* (2013.01); *G16H 20/10* (2018.01); *G16H 20/40* (2018.01); *A61B 34/32* (2016.02)

(58) Field of Classification Search
CPC .......... B25J 9/1656; B25J 9/08; B25J 11/008; A61B 34/10; A61B 34/32; A61B 2090/365; G16H 20/10; G16H 20/40; G16H 50/20; G16H 40/67
See application file for complete search history.

(56) References Cited

U.S. PATENT DOCUMENTS

| | | |
|---|---|---|
| 2011/0130636 A1 | 6/2011 | Daniel et al. |
| 2016/0244163 A1 | 8/2016 | Peeters et al. |
| 2017/0092109 A1 | 3/2017 | Trundle et al. |

(Continued)

OTHER PUBLICATIONS

Yip et al., "Robot Autonomy for Surgery", World Scientific Review, arXiv preprint arXiv:1707.03080, 2017, 33 pages.

(Continued)

*Primary Examiner* — Bao Long T Nguyen (57) ABSTRACT

System, methods, and other embodiments described herein relate to autonomous configuration of a multifunction robot for healthcare-related tasks. In one embodiment, a method includes, responsive to receiving, in the multifunction robot, selection data that identifies a treatment plan for a patient, analyzing the selection data to identify one or more task modules for carrying out the treatment plan. The method includes determining a module layout for the multifunction robot according to the task modules for carrying out the treatment plan. The method includes configuring the robot with at least one of the task modules according to the module layout.

20 Claims, 8 Drawing Sheets (56) References Cited

U.S. PATENT DOCUMENTS

| | | |
|---|---|---|
| 2017/0329916 A1 | 11/2017 | Bychkov et al. |
| 2018/0322660 A1 | 11/2018 | Smith |
| 2019/0008598 A1 | 1/2019 | Frimer et al. |
| 2019/0117181 A1 | 4/2019 | Ishii et al. |
| 2019/0262084 A1 | 8/2019 | Roh et al. |
| 2020/0027560 A1 | 1/2020 | Ling et al. |
| 2020/0035335 A1 | 1/2020 | Kivatinos et al. |
| 2020/0098461 A1 | 3/2020 | Macoviak et al. |
| 2020/0111578 A1 | 4/2020 | Koblick et al. |
| 2020/0302144 A1 | 9/2020 | Leshem et al. |
| 2020/0338309 A1* | 10/2020 | Kopperschmidt ............ A61M 25/0116 |
| 2021/0327578 A1 | 10/2021 | Buchard et al. |
| 2022/0037039 A1 | 2/2022 | Wein |
| 2022/0047339 A1* | 2/2022 | Prior ................ A61B 1/05 |

OTHER PUBLICATIONS

Sahashi, et al., "A study of operational liability of the medical rescue robot under disaster," 2011 IEEE/SICE International Symposium on System Integration (SII), 2011, 6 pages.

\* cited by examiner

FIG. 8

AUTONOMOUS AND SEMI-AUTONOMOUS MULTIFUNCTIONAL MEDICAL ROBOTS, TEAMS AND SYSTEMS

CROSS-REFERENCE TO RELATED APPLICATIONS

This application is a continuation in part of and claims the benefit of U.S. Non-Provisional application Ser. No. 17/836,264, filed on Jun. 9, 2022, which is herein incorporated by reference in its entirety. Additionally, this application claims priority to U.S. Provisional Application No. 63/390,816 filed on Jul. 20, 2022, which is herein incorporated by reference in its entirety.

TECHNICAL FIELD

The subject matter described herein relates, in general, to improving the implementation of healthcare through the use of multifunction robots and, more particularly, to using interchangeable modules that a robot can use to perform self-assignment of a function by autonomously configuring itself for a healthcare-related task.

BACKGROUND

Healthcare represents a myriad of complexities for providing quality care. For example, expenses associated with healthcare continue to rise on a yearly basis. Contributors to costs include direct costs of personnel for doctors, nurses, and other caregivers. These costs continue to grow as the availability of caregivers lessens with increased demand. Moreover, further factors that raise costs include insurance premiums, advanced medicine, new medical devices/procedures that require years of investment to develop, and so on. In addition to costs, the accuracy of care is also a difficulty that influences overall quality. As caregivers may be in limited supply, some caregivers may be overextended by working excess hours, thereby potentially increasing the occurrence of errors. Accordingly, providing quality healthcare can encounter various difficulties.

Moreover, robotic systems within the context of healthcare generally have limited utility. That is, telemedicine robots may include a specific arrangement of cameras and displays, automated devices for acquiring patient information (e.g., blood pressure) are generally standalone devices that require a human to set up and initiate, and so on. While these devices/robots are useful, they tend to be statically configured and often require human operators/assistance. Thus, the costs of these healthcare robots is generally high for the limited roles that they can satisfy.

SUMMARY

In various embodiments, example systems and methods relate to a manner of improving healthcare through the use of multifunction robots that autonomously operate to self-configure for different tasks and provide treatment to patients. In general, a multifunction robot may take various forms that can include an interchangeable task-specific robot belly. The robot belly is modular and may accept task-specific modules for all healthcare applications, such as preventive medicine, medical diagnosis, treatments, and others. Moreover, the multifunction robot may operate independently or as a team or medical sensor net as part of an overall autonomous architecture.

In some arrangements, the robot is at least partially comprised of a hardware platform that includes a frame configured to support the robot and various components thereof both mechanical and electronic. For example, a management system may couple with the frame and function to control various actuators, motors, and so on to move the multifunction robot and articulate arms or other appendages to interact with objects in an environment. In some embodiments, the management system may include an onboard processor to operate the hardware platform.

As noted, the multifunction robot may configure itself with different task-specific modules for undertaking different healthcare-related tasks. In some embodiments, the multifunction robot configures itself to include a medical sensor-nets communications network system, biosensor sets, a therapeutic chip system, a therapeutic 3d bioprinting system, a therapeutic treatment system, micro- and nano-fluidic therapeutic and diagnostic chips, medical liquid delivery robots, micro, nano, endoscopy modules, multifocal clinical lenses, and so on.

In general, the management system of the multifunction robot operates to autonomously configure the multifunction robot with one or more task-specific modules in order to customize the multifunction robot for a particular treatment associated with a patient. As one example, the management system of the multifunction robot receives selection data from a cloud-based system. The selection data indicates information, such as a treatment. The selection data may further indicate specific information about a patient associated with the treatment, a location of the patient, and so on. In any case, the management system analyzes the selection data to identify which task modules from a set of available modules should be outfitted to perform the treatment plan. Once the management system determines which task modules are needed, the management system can further determine a module layout. The module layout relates to how the task modules are inserted into the multifunction robot, such as a specific order or another arrangement. The module layout may further involve allocating one or more task modules to additional robots that can be conscripted into providing treatment along with the multifunction robot. The additional robots are generally also multifunction robots. Accordingly, once the module layout is determined, the management system can control the multifunction robot to self-assemble by retrieving and inserting the appropriate task modules. Once outfitted, the management system then dispatches the multifunction robot to execute the treatment plan.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed for improving healthcare by implementing multifunction robots that autonomously configure according to tasks specific to a current treatment plan. As previously noted, various aspects of modern healthcare contribute to difficulties in providing quality care across the population and at reasonable costs. For example, costs associated with care-specific devices can be an impediment to implementing more advanced technologies.

Therefore, in at least one embodiment, a management system is disclosed for implementing intelligent autonomous multifunction robots that operate to alleviate the noted difficulties through self-configuring a modular belly with task-specific modules. As previously described, the management system of the multifunction robot operates to autonomously configure the multifunction robot with one or more task-specific modules in order to customize the multifunction robot for a particular treatment associated with a patient. As one example, the management system of the multifunction robot receives selection data from a cloud-based system. The selection data indicates information, such as a treatment. The selection data may further indicate specific information about a patient associated with the treatment, a location of the patient, and so on. In any case, the management system analyzes the selection data to identify which task modules from a set of available modules should be outfitted to perform the treatment plan. Once the management system determines which task modules are needed, the management system can further determine a module layout. The module layout relates to how the task modules are inserted into the multifunction robot, such as a specific order or another arrangement. The module layout may further involve allocating one or more task modules to additional robots that can be conscripted into providing treatment along with the multifunction robot. The additional robots are generally also multifunction robots. Accordingly, once the module layout is determined, the management system can control the multifunction robot to self-assemble by retrieving and inserting the appropriate task modules. Once outfitted, the management system then dispatches the multifunction robot to execute the treatment plan.

Furthermore, while the present disclosure is generally described in relation to a single multifunction robot, a plurality of multifunction robots that are adaptable and arrangeable may operate in concert using a communication network to coordinate. In one or more arrangements, a lead robot that originally receives the selection data communicates with the plurality of robots to conscript and assign functions according to the module layout, as will be described in greater detail subsequently. Overall, the multifunction robots comprise an arrangement of hardware and software elements for effecting assigned tasks such that operation of the system effects learning on the part of one or a plurality of the robotic devices, and on the part of the system as a whole. In various approaches, the management system implements learning algorithms, evolutionary algorithms, and other mechanisms that provide for self-learning and evolution of described approaches.

Figure 1:
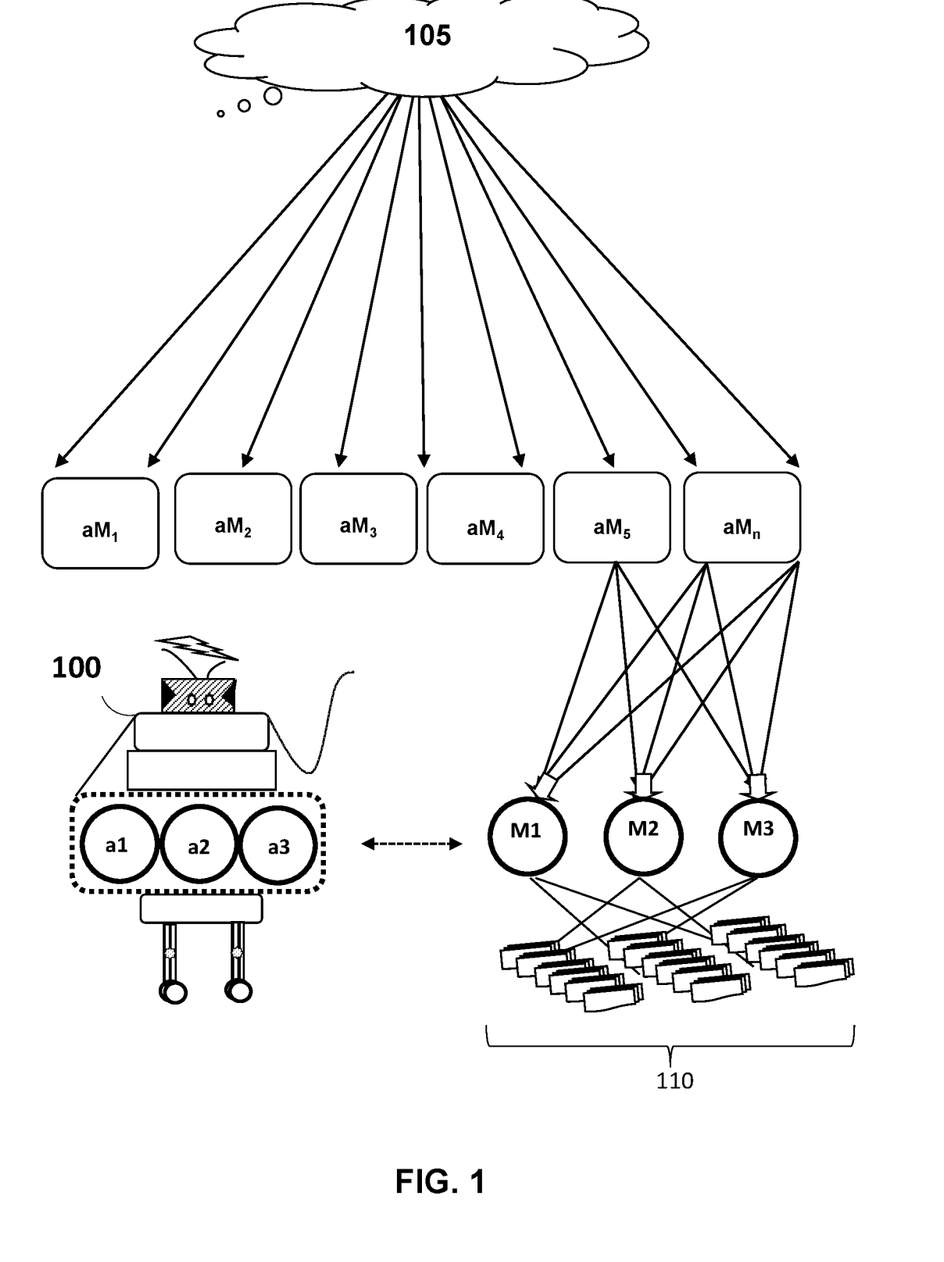
FIG. 1 illustrates one example of a robot belly for a multifunction robot in relation to a selection process.

With reference to FIG. 1, a multifunction robot 100 is shown in relation to a plurality of multifunction robots $aM_{1...n}$. The multifunction robots are configured for performing various healthcare-specific tasks according to a selection and a configuration with task modules. In general, the multifunction robots may be separately configured with different modules M1, M2, M3, Mn, etc. Moreover, the multifunction robot 100 and the additional robots $aM_{1...n}$ are in communication via a network 105. The network 105 is a communication network that facilitates exchanging information between the different robots and may further function to exchange information with a cloud-based resource, such as a remote system that acquires and assesses information about patients to dispatch the robots to provide medical care.

The multifunction robots can each include common structural, mechanical, electrical and/or computing systems, that are configured to be coupled with an interchangeable task module. The separate task modules 110, including M1, M2, and M3 are of different types that can perform separate unique healthcare tasks when integrated with the robot 100. The robot 100 integrates a task module for a particular healthcare task to be performed by the robot 100. The modules 110 include separate components for performing separate tasks. The components can include different sensors, medical devices, appendages, and so on.

The healthcare robots may be used to achieve a healthcare objective associated with a treatment plan for treating a particular patient. In some implementations, the robots may be used for different medical or patient-centric functions, including rescue, screening, surgery, preventative care, drug delivery, rehabilitation, and so on. The separate robot may be deployed to a particular site, working individually and/or in a collaborative fashion to perform related tasks to achieve a collaborative treatment.

FIG. 1 shows an example of a multifunction robot 100. The multifunction robot 100 may include a basic platform having structural, computing and support systems that is configured to couple with a variety of interchangeable task modules via a modular belly. The robot 100 may include a structural frame or platform. The structural platform may include an upper enclosure and a lower support frame with a variety of different mechanical and electrical mounting locations and configurations. The lower support frame may support the various modules and other components of the robot 100. The enclosure may house the various modules and components while further providing interconnects for power, data, hydraulics, pneumatics, and so on. The robot 100 may further include a data module, a power module, and/or other functional modules to support overall functions of the robot 100. The power module may include one or more of the following: a power supply, a wiring and/or a power bus, a voltage or current converter, controllers, and hardware to provide power to the various other modules of the multifunction robot 100. Optionally, a power supply may be integrated with a particular task module to supply and/or supplement power to the task module.

As shown in FIG. 1, the robot 100 includes three separate task modules with the modular belly. While three separate locations are shown, of course, the robot 100 may be configured with a different number of module bays in the belly. Moreover, the task modules themselves may consume a different amount of space within the belly depending on an associated function. Thus, one module may consume all available space within the belly while another task module may consume less. Accordingly, the robot may be configured with one or many different task modules and thus may be configured to perform a single task or many different tasks depending on the configuration of modules. It should be appreciated that the particular arrangement of task modules may influence the ability of the robot 100 to perform a particular task. That is, in one or more arrangements, multiple task modules with different functions may be loaded into the robot 100 in order to achieve a single overarching task. In further aspects, the robot 100 may perform a task in cooperation with another robot, and thus a combination of task modules between the multiple robots function to achieve a particular task in relation to a treatment plan. Thus, the particular arrangement of task modules may vary according to a module layout, as will be discussed further subsequently.

The multifunction robot 100 may include a therapeutic cycle system (also referred to as a task module herein) in various approaches. The therapeutic cycle system may include a set of therapeutic cycle tools for performing specific healthcare tasks and may be implemented as a task module that is selectively integrated with the robot 100. The therapeutic cycle tools may be used for achieving healthcare objectives, such as a task that is part of a treatment plan. The therapeutic cycle system may be integrated in various areas of the robot 100. For example, in some implementations, components of the therapeutic cycle system may be coupled with the robot structural platform on the front, rear, top, bottom, or sides thereof. The therapeutic cycle system may include a medical screening module including biosensor sets, therapeutic chips, therapeutic 3D bioprinting, therapeutic treatment delivery system, microfluidic and nanofluidic array, medical liquid delivery system, endoscopy therapeutic robots, multifocal clinical lenses system, a robotic instrument arm module, including articulable joint and connecting linkages, a mixer module including a vessel that may be rotatable, and/or a fluid container module including a fluid carrying vessel.

The therapeutic cycle system may be selected in accordance with the specific healthcare tasks that are performed by the specific multifunction robot 100. The following examples of multifunction robots shown in and described with respect to FIG. 4 may each include a multifunction robot 100 as a base and carry a different therapeutic cycle system as a task module and as selected according to the cloud-based healthcare system assessing a patient, selecting one or more therapeutic algorithms, and providing the selection data to the multifunction robot 100. The therapeutic cycle system may further include a robotic instrument, sensor, articulated arm, mobility device, surgical instruments, and so on.

The surgical instruments may include a reciprocating or rotating blade for medical procedures. The surgical instruments may be powered by an electric motor or another type of actuator. The surgical instruments may be mounted on a robotic instrument arm. The robotic instrument arm may include a plurality of joints and linkages for articulating the position of the surgical instruments. The medical screening therapeutic cycle system may be used for robot-specific healthcare tasks that include ACL reconstruction surgery, ankle replacement surgery, bone fracture repair, cervical disc surgery, herniated disk surgery, hip replacement surgery, joint fusion surgery, knee replacement surgery, laminectomy, osteotomy, rotator cuff surgery, shoulder replacement surgery, spinal fusion, Tommy John surgery/UCL reconstruction, torn PCL surgery, vertebroplasty/kyphoplasty, clubfoot correction, congenital heart defect surgery, appendectomy, ablation, aneurysm repair, angioplasty & stent placement, aortic valve replacements/TAVR, cardiac catheterization, cardioversion, carotid surgery, heart bypass surgery, heart valve repair, left ventricular assist device, pacemakers, trans-myocardial revascularization, appendectomy, cataract surgery/refractive lens exchange, c-section, heart bypass surgery, and so on. The therapeutic cycle system may also include a second sensor. The second sensor may be mounted on the second robotic instrument arm. Similar to the first sensor, the second sensor may be used for mapping the patient specimen and controlling the surgical instruments.

Figure 2:
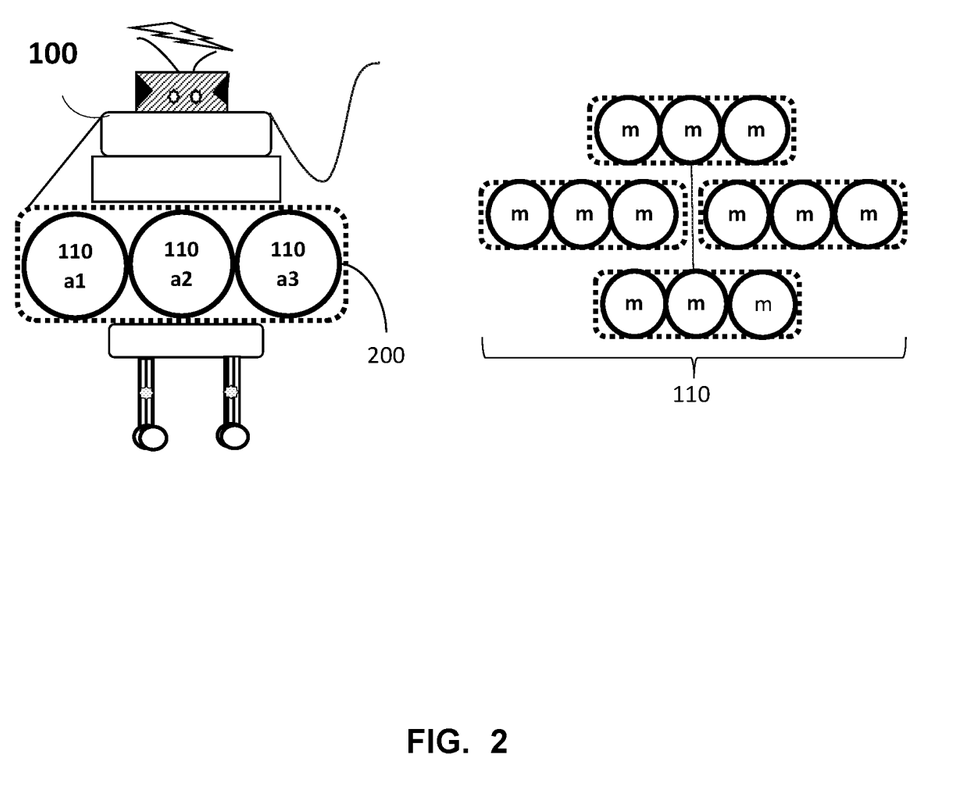
FIG. 2 illustrates a multifunction robot according to a module layout.

As further shown in FIG. 2, the multifunction robot 100 can configure a modular belly with different ones of the task modules 110 depending on a task that the robot 100 is to implement. The robot 100 identifies the task modules for achieving a treatment plan and assigns specific modules to itself and additional robots, as needed, according to a module layout. The module layout identifies a specific arrangement of the task modules 110 in relation to positioning within the robot 100 and the additional robots in order to optimize the assignment and placement of the task modules 110 for executing the treatment plan.

Figure 3:
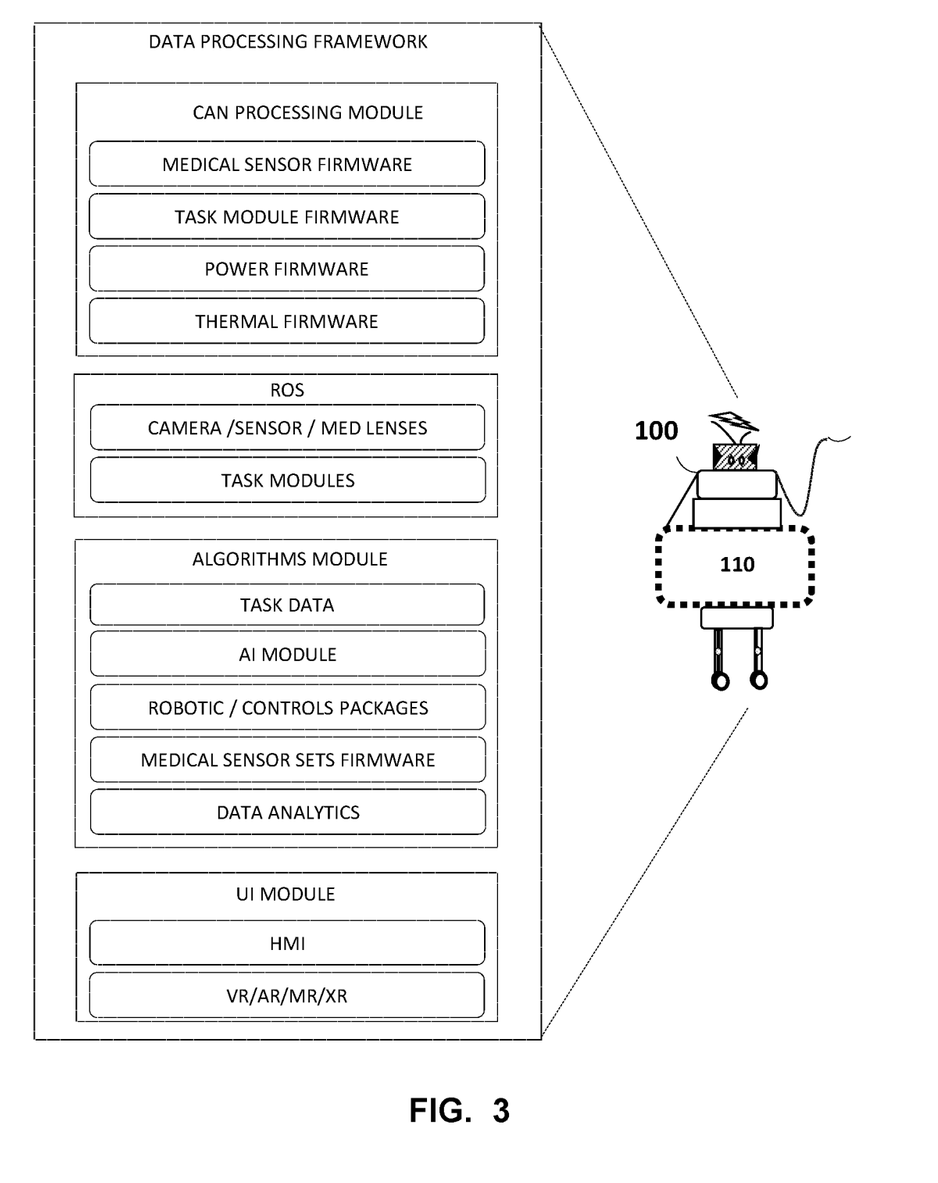
FIG. 3 is a block diagram of a multifunction robot.

With reference to FIG. 3, FIG. 3 illustrates a block diagram of an example of subsystems that may be included within the multifunctional robot 100. In particular, FIG. 3 outlines a data processing framework of the robot 100. The robot 100 is shown as a block diagram with various modules. It should be appreciated that all of the indicated subsystems may be modularized so that simplicity in the hardware and software functional assembly is persistent across separate iterations of the robot 100. Standard interfaces may be implemented so that integration overhead is minimal for structural, power and data interfaces. In some implementations, universal interfaces may control the data, power, and consumables that flow between modules.

The robot 100 includes a CAN processing module, shown as a software processing framework. The CAN processing module may manage data processing across different modules in the robot 100. For example, the CAN processing module may ensure data integrity, minimal latency, delivery assurance, archiving and visualization. The CAN processing module may be in communication with one or more modules for controlling and/or managing the robot 100. As shown, the CAN processing module is a controller area network (CAN) that provides and manages communications between firmware controllers integrated with a CAN bus. As shown, the CAN processing module interfaces with medical sensors firmware, task module firmware, power firmware, and thermal firmware.

In some implementations, the underlying data processing architecture may include a data management module. The data management module may include an open source, in-memory data structure store, used as a database, cache, and message broker, such as a clinical database. The data management module may include interfaces and APIs configured to transact operations and telemetry with the CAN, the robot operating system (ROS), and other processing frameworks in the robot 100. The architecture may also include a human-machine interface (HMI) to operate robot missions, an injector to an influx relational database or equivalent to visualize operational data. The CAN processing module is further in communication with a robot operating system (ROS) module. The ROS module interfaces with one or more processing modules for sensors and packages integrated into the ROS. As shown, the ROS is in communication with various sensors or other inputs (e.g., Camera/Sensor/Med Lenses), and task modules.

The CAN processing module is further in communication with an algorithms module. The algorithms module is in communication with task data, an artificial intelligence (AI) module, and a controls module, shown as robotics/controls packages. The AI module may be implemented by robust robotic and controls algorithms and machine learning, e.g., reinforcement learning, deep reinforcement learning, and/or other methodologies. Machine learning agents may be embedded at the robot 100. In some implementations, the robot 100 may include a targeted module. The targeting module may be part of the artificial intelligence module, the controls module, or other modules. The targeting module may include ML or other AI algorithms for the use of various tools or combinations thereof, such as robot arms and/or demolition hammers, to intelligently target the regions in the panel to excavate/demolish.

The CAN processing module is further in communication with a user interface module. The user interface module is in communication with a human-machine interface (HMI) module, a data analytics module, and/or a virtual reality/augmented reality (VR/AR/MR/XR) module. The user interface module may be accessed directly in an onboard processor or remotely via a virtual private network (VPN) or secure encrypted connection. The robot 100 may transmit data, for example, via a team communications network such as a wireless ad-hoc network, to a team control center, for example, for monitoring and support of the healthcare robots and/or a team. Although not explicitly illustrated, the data process framework of the robot 100 may further include a remote communication system that is configured to receive data from a cloud-based system and/or additional robots.

Figure 4:
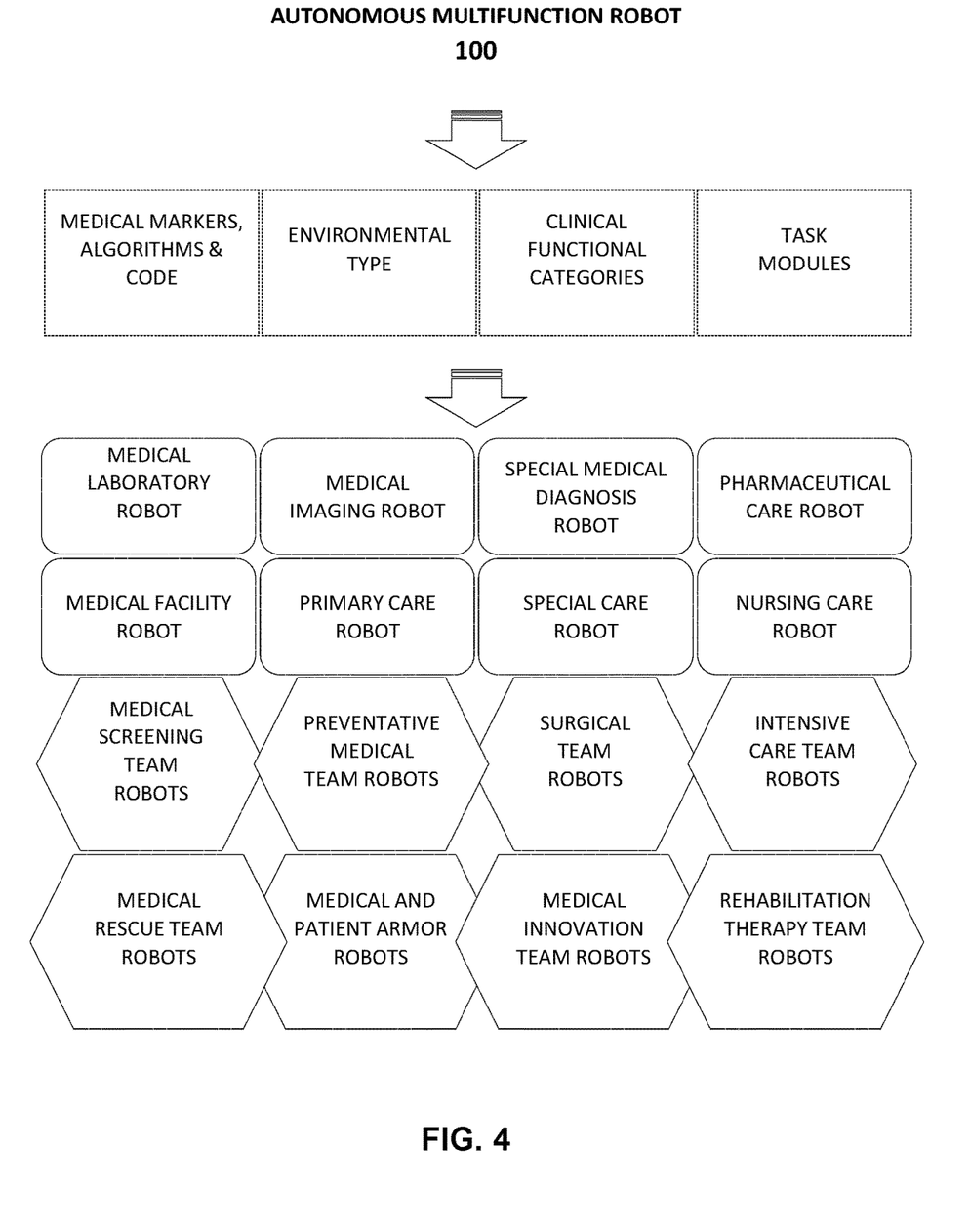
FIG. 4 illustrates various components associated with a multifunction robot in a healthcare context.

FIG. 4 further illustrates a general process of configuring the robot 100 into a task-specific multifunction robot. As a general principle, the robot 100 acquires selection data that facilitates determining how to configure the robot 100. The selection data may include different information, such as available task modules and additional robots, algorithms, environment type, clinical functional categories, and other information that facilitates identifying how to select and arrange task modules for execution of a treatment plan. Accordingly, based on the selection data, the robot 100 autonomously selects and configures itself with appropriate task modules to undertake a task associated with the treatment plan. As shown in FIG. 4, the robot 100 may configure itself into may different types of task-specific robots. For example, the robot may select different combinations of task modules to insert into a modular belly to become a medical laboratory robot, a medical imaging robot, a special diagnosis robot, a pharmaceutical care robot, a medical facility robot, a primary care robot, a special care robot, a nursing care robot, a medical screening team robot, a preventative medical robot, a surgical team robot, an intensive care team robot, a medical rescue team robot, a medical and patient armor robot, a medical innovation team robot, a rehabilitation robot, and so on.

As further explanation of the robot 100, the multifunction robot 100 includes an overall hardware platform. The hardware platform integrates hardware subsystems, which may include subsystem and structural hardware, computer hardware, and/or software. The healthcare robot 100 includes a modular belly. The belly may include one or more of the following to facilitate movement of the robot 100: a multi-track module, a wheeled module, a legged module, and a hybrid module. The various robot modules are dedicated to moving the healthcare robot 100. Different types of modules may be integrated with the basic robot structural frame.

The robot 100 may further include a power platform. The power platform may include one or more of the following: a power bus and sensor module, a voltage/current up/down converter module, and one or more power control modules. The various power modules may include power buses and/or wiring harnesses, controllers, and hardware to supply power to the different hardware modules at a correct voltage and with protections against over/undercurrents, shorts, and electrostatic discharge. The robot 100, in various arrangements, includes a structure platform. The structure platform may include a therapeutic cycle rack enclosure, such as a flat bed with side walls and cover, in or with which the other modules may be integrated and enclosed, for environmental control, etc.

With reference back to FIG. 2, the robot 100 includes a robot belly 200, which is also referred to as a modular belly herein. The robot belly includes a subsystem firmware. The subsystem firmware includes an operations module, a status module, a position module, and a set of sensors. Subsystem data may be generated in the subsystem firmware and analyzed using the various modules. The operations module may analyze subsystem data that includes data related to operational status of the robot belly, such as operational parameters of how a task module is presently operating. The status module may analyze subsystem data that includes data related to housekeeping, temperature, fault status, etc. The position module may analyze subsystem data that includes data related to robot belly geo-location, relative subsystem position such as positions or orientations of articulated components such as arms, legs, tools, etc.

The robot belly 200 can include a bus processing system. The bus processing system may process data based on application of a team algorithm to the firmware data received from the subsystem firmware of the robot belly 200. The data may be received from the robot belly 200 and/or from additional robots, such as neighboring robots, robots within a same team. The robot belly 200 includes a communications system. The communications system may be configured to transmit and receive the various data from and to the robot belly 200. The communications system may package the data for transmission. The communications system may relay data received, for example, from neighboring robots. Data may be transmitted/received to/from the robot belly 200. Various approaches to the communications networks described herein may be implemented. In some implementations, networking is accomplished by a mobile ad-hoc network. It may be a fixed network.

Figure 5:
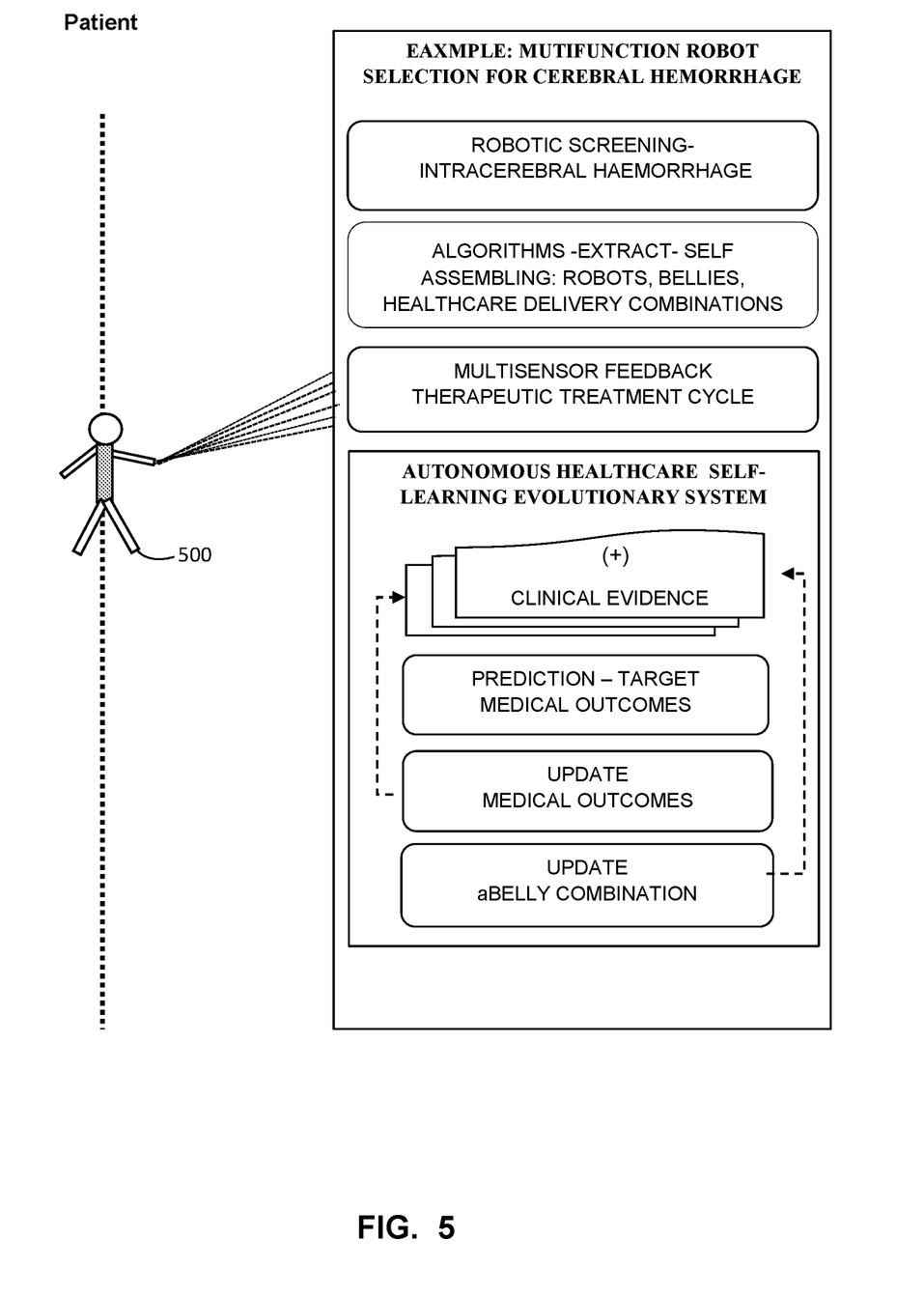
FIG. 5 illustrates an example of how a multifunction robot may select task modules for a cerebral hemorrhage.

FIG. 5 shows an example of a process for outfitting a multifunction robot for cerebral hemorrhage including robots, task modules for inclusion in modular bellies, and clinical process component in the bellies in accordance with an embodiment of the present invention. Thirty-day mortality rates in patients with spontaneous intracerebral hemorrhage (ICH) range from 35% to 50%, with only 10-20% of the survivors regain functional independence. Both pharmacologic and surgical time to treatment can be critical to improving outcomes.

Most patients will be initially assessed with autonomous medical screening robots that are derived from the robot 100 by being specifically configured. Triage can then be passed to another robot according to a clinical need (i.e., a treatment plan developed from information gathered by the screening robot). However, some patients may complete their treatment at the triage stage, for instance if the condition is very minor and can be treated quickly, if only advice is required. Conversely, patients with evidently serious conditions, such as cardiac arrest, will bypass triage altogether and move straight to the appropriate part of robot treatments.

As further outlined in FIG. 5, from the screening information, a cloud-based system can select appropriate algorithms for therapeutics to treat diagnosis. This information can be communicated to the robot 100, which then functions to self-assemble according to task modules necessary to treat the patient. This process can then repeat as treatment is provided according to feedback through information observed by the treating robot(s). As further illustrated in FIG. 5, a learning process that influences robot task module selection and dispatching is also shown. That is, as the robot 100 accumulates information over multiple iterations of treating different patients, the selection of task modules and execution of tasks with the task modules can be updated. For example, as shown in FIG. 5, the learning and evolutionary process collects clinical evidence from which predictions about medical outcomes can be generated (i.e., treatments, task module selections, etc.). As medical outcomes are observed, the medical outcomes can be updated relative to the prediction and then the task module selection and implementation can be further improved in relation to feedback from the patient. In this way, the robot 100 can improve a response to a patient by adapting how the selection of task modules occurs and how the task modules are used to fulfill a treatment plan for a patient.

Figure 6:
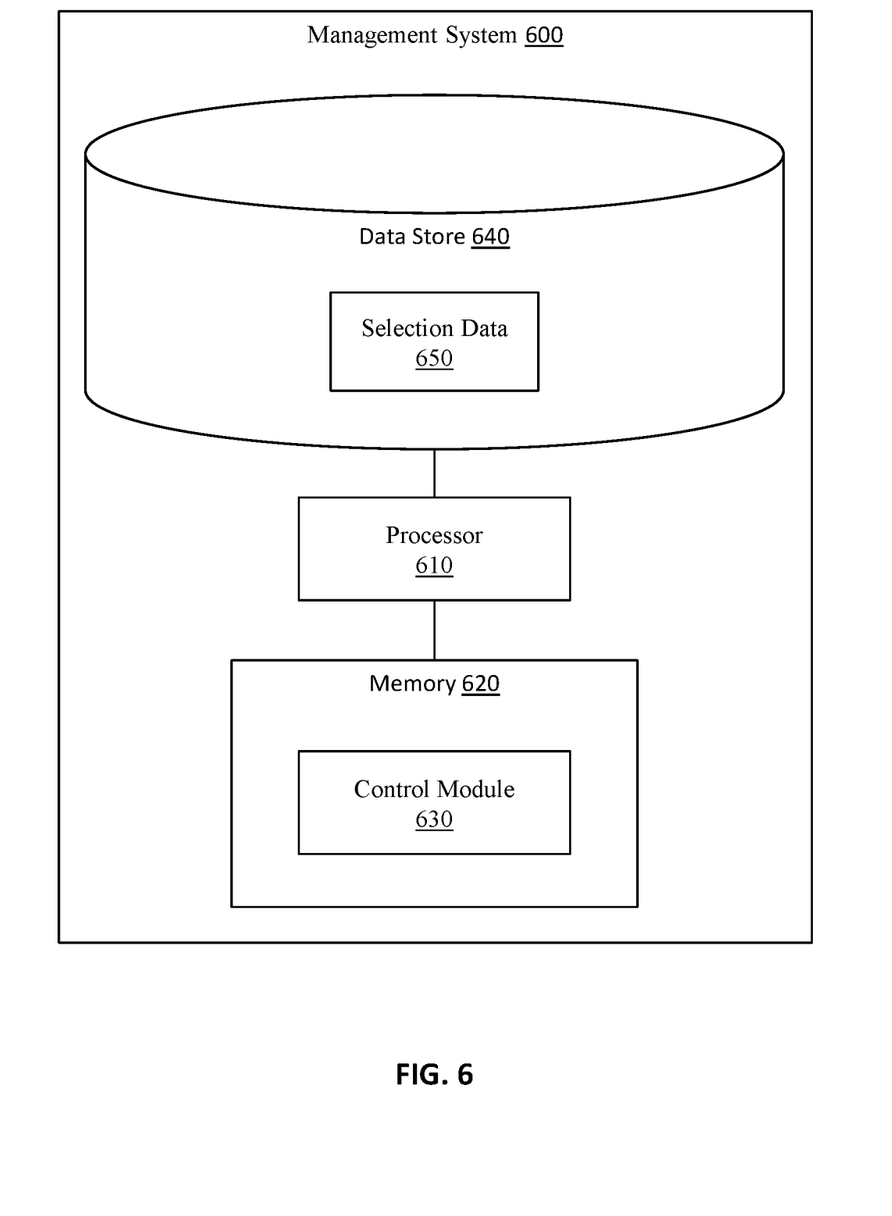
FIG. 6 illustrates one embodiment of a management system associated with autonomously configuring a multifunction robot.

With reference to FIG. 6, one embodiment of a management system 600 is further illustrated. The management system 600 is shown as including a processor 610. Accordingly, the processor 610 may be a part of the management system 600 or the management system 600 may access the processor 610 through a data bus or another communication path as a shared resource (e.g., a distributed processing environment). Thus, the processor 610 may communicate with the management system 600 through a communication network or may be co-located with the management system 600. In one embodiment, the management system 600 includes a memory 620 that stores a control module 630. The memory 620 is a random-access memory (RAM), read-only memory (ROM), a hard-disk drive, a flash memory, or other suitable memory (either volatile or non-volatile) for storing the control module 630 and/or other information used by the management system 600. The control module 630 is, for example, computer-readable instructions within the physical memory 620 that, when executed by the processor 610, cause the processor 610 to perform the various functions disclosed herein. Moreover, the management system 600 is generally embedded within the multifunction robot 100 to provide various controls and decision-making processes therein. As such, the management system 600 may be operatively connected with a communication bus within the robot 100 to facilitate various functions described herein.

Continuing with FIG. 6 and a general embodiment of the management system 600, in one or more arrangements, the management system 600 includes a data store 640. The data store 640 is, in one embodiment, an electronic data structure (e.g., a database) stored in the memory 620 or another electronic memory and that is configured with routines that can be executed by the processor 610 for analyzing stored data, providing stored data, organizing stored data, and so on. Thus, in one embodiment, the data store 640 stores data used by the module 630 in executing various functions. In one embodiment, the data store 640 includes selection data 650. The selection data may include various different information as outlined previously. However, the selection data 650 includes at least information that the control module 630 can use to identify which task modules are needed for a treatment plan. Thus, by way of example, the selection data 650, in a simplest form, may include a treatment plan. The treatment plan outlines therapies (e.g., pharmaceutical, surgical, etc.) that are to be provided to a patient along with, for example, any specific monitoring/screening of the patient that is to be undertaken. In a further aspect, the selection data 650 includes specific therapeutic algorithms or at least identifiers of algorithms selected by a cloud-based resource (e.g., 105) for performing one or more therapies on the patient. Event still, the selection data 650 can include a location of the patient, an environment of the patient, and other contextual indicators that inform the selection of task modules for carrying the treatment plan.

To acquire the selection data 650, the management system 600 may include or at least functions in cooperation with a communication system. In one embodiment, the communication system communicates according to one or more communication standards. For example, the communication system may be wired, wireless, or a combination thereof. The communication system can include multiple different antennas/transceivers and/or other hardware elements for communicating at different frequencies and according to respective protocols, whether wired or wireless. The communication system, in one arrangement, communicates via a communication protocol, such as a WiFi, DSRC, V2I, V2V, or another suitable protocol for communicating between the management system 600 and the respective robots. Moreover, the communication system, in one arrangement, further communicates according to a protocol, such as the global system for mobile communication (GSM), Enhanced Data Rates for GSM Evolution (EDGE), Long-Term Evolution (LTE), 5G, or another communication technology that provides for the management system 600 communicating with various remote robots. In any case, the management system 600 can leverage various communication technologies to provide communications to other entities and/or receive information from other entities, such as the selection data 650. In further aspects, the selection data 650 includes information about available resources, such as available supplies for treatment, different task modules that are currently available, and so on.

In any case, the control module 630 includes instructions that function to control the processor 610 to perform various functions in support of autonomously configuring the robot 100. Briefly, the control module 630 includes instructions to analyze the selection data 650 in order to identify task modules from available modules. As outlined previously, the task modules are modular components that can be connected and integrated into the robot 100 in order to impart additional functionality. The task modules include a wide array of different configurations. For example, the task modules include different arrangements of sensors, such as medical imaging sensors, biometric monitoring sensors (e.g., EKG, blood pressure, etc.), pharmaceutical delivery mechanisms, surgical procedure tools, and so on. In general, the task modules include different arrangements of components for autonomously performing any function that may be performed by an emergency responder, a nurse, a doctor, and so on in relation to providing treatment to patient.

Moreover, it should be appreciated that the different combinations of the task modules may provide greater functionality together than individually. That is, a single task, in one or more arrangements may use multiple different task modules. Moreover, a single task module may, in some instances, be shared among multiple different tasks. Therefore, the control module 230 identifies the task modules associated with separate tasks and further determines a module layout within the robot 100 and any additional robots that may be needed in order to achieve performance of individual tasks and multiple separate tasks defined by the treatment plan. Once the control module 230 determines the module layout, the control module 230, in at least one approach, controls the robot 100 to insert appropriate task modules into a belly of the robot 100. In this way, the management system 600 is able to dynamically configure the robot 100 to perform a particular task that is specific to treatment of a patient, thereby improving the treatment through customization of the robot while also better utilizing the robot.

Figure 7:
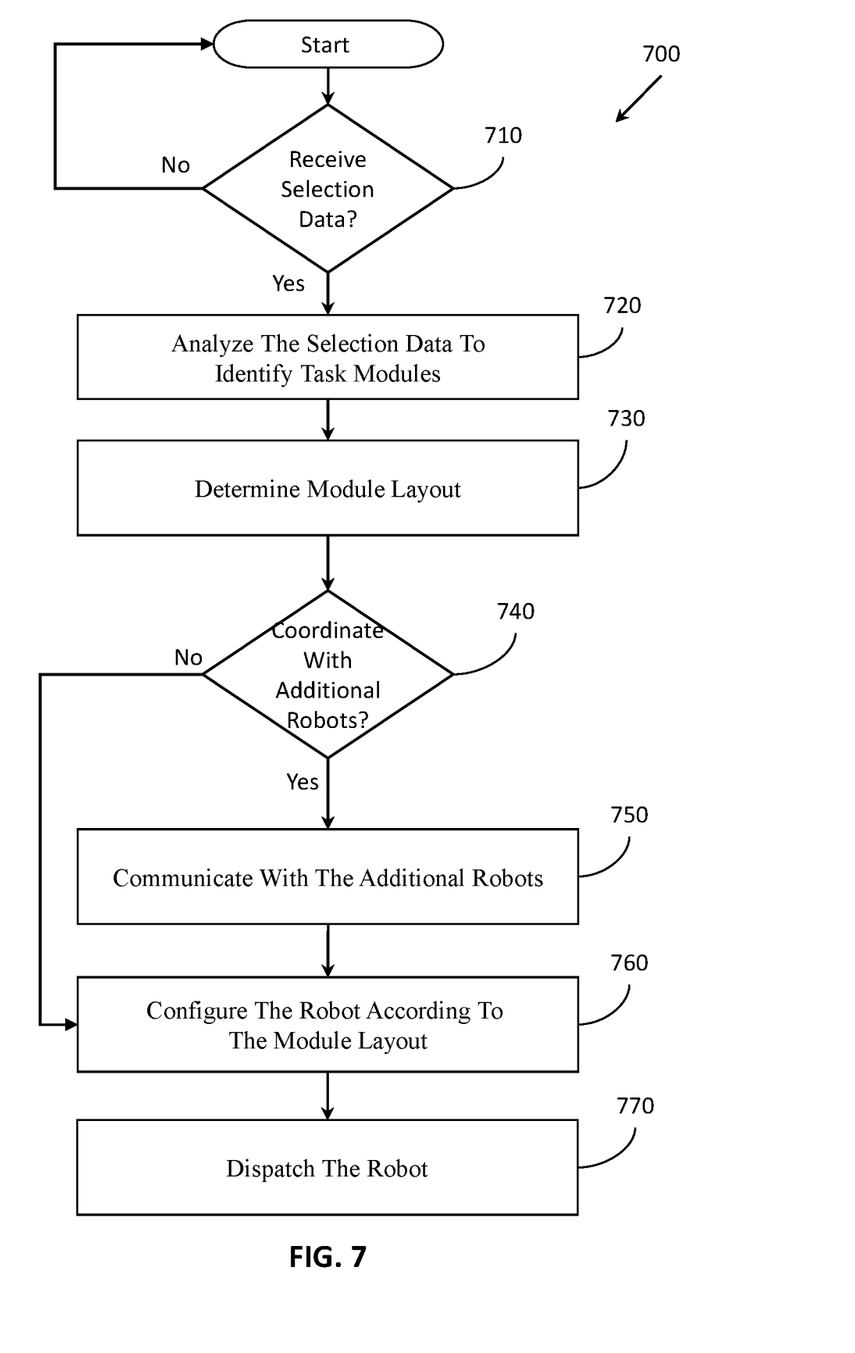
FIG. 7 is a flowchart illustrating one embodiment of a method associated with autonomously configuring a multifunction robot.

Additional aspects about autonomous healthcare using robotic devices will be described in relation to FIG. 7. FIG. 7 illustrates a flowchart of a method 700 that is associated with autonomous configuration of a multifunction robot. Method 700 will be discussed from the perspective of the management system 600 of FIG. 6 as implemented within the multifunction robot 100 of FIG. 1. While method 700 is discussed in combination with the management system 600, it should be appreciated that the method 700 is not limited to being implemented within the management system 600 but is instead one example of a system that may implement the method 700. Furthermore, while the method is illustrated as a generally serial process, various aspects of the method 700 can execute in parallel to perform the noted functions.

At 710, the control module 630 determines when the robot 100 receives the selection data 650. Reception of the selection data 650 acts as a control signal to the robot 100 from, for example, a cloud-based healthcare system to control the robot 100 to self-configure and proceed with treatment. In general, the cloud-based healthcare system generates at least a portion of the selection data 650 according to an initial assessment of the patient. The initial assessment may occur according to sensor data acquired by the system from a screen robot or from another source. In any case, the selection data 650 itself indicates one or more clinical procedures that may embody different therapies as part of the treatment plan.

At 720, the control module 630 analyzes the selection data 650 to identify one or more task modules for carrying out the treatment plan. In one or more approaches, the control module 630 determines which task modules of a set of available modules are needed to implement the treatment plan. As outlined previously, the control module 630 identifies the task modules according to the selection data 650. Thus, the control module 630 may use a process of comparison with the selection data 650 and the treatment plan to determine which task modules are appropriate. In further instances, the control module 630 implements one or more machine learning algorithms that accept the selection data 650 as input and output a list of the task modules. While the treatment plan itself is generally discussed as being a primary piece of information for determining the task modules, the control module 630 can use additional information to adapt the selection. In various instances, the current context, such as environment, available resources, etc., may influence which task modules are available or are appropriate for the treatment plan. As one example, where one task module associated with delivery of a particular drug is not available, another drug and associated task module may be substituted. Similarly, whether the treatment is delivered indoors versus outdoors or other aspects of the context may influence selection of a particular task module.

At 730, the control module 630 determines a module layout for the multifunction robot 100 according to the task modules for carrying out the treatment plan. The control module 630 determines the module layout in order to identify how to populate available space within the multifunction robot 100 to achieve the treatment plan. In various arrangements, the control module 630 determines the module layout according to a limited amount of space in the modular belly of the robot 100. That is, in general, the bays of the modular belly may be similarly configured. However, in further arrangements, the bays may have different features, such as different power availability, different connections for data, and so on. Moreover, the robot 100 may have overall defined specifications for supporting task modules in the bays such that, as one example, multiple task modules with relatively high-power demand may be beyond capabilities of the robot 100. Therefore, the control module 630 determines which task modules are suitable for integration together in the robot 100 and may further conscript additional robots to assist in performing the treatment plan when the robot 100 is not capable of fulfilling the treatment plan alone.

At 740, the control module 630 determines whether the module layout indicates that additional robots are to be conscripted in order to satisfy the treatment. In general, the module layout indicates which task modules are to be used in performing the treatment plan and which of the task modules are to be integrated with the robot 100. Thus, when the module layout includes additional task modules beyond those outfitted with the robot 100, then the control module 630 determines that the additional robots are needed. In such a case, the control module 630 proceeds to communicate with the additional robots as discussed at block 750. Otherwise, the control module 630 proceeds with configuring the robot 100 as discussed at block 760.

At 750, the control module 630 communicates with one or more additional robots to conscript the one or more additional robots to assist in performing the treatment plan. In one approach, the control module 630 allocates at least one task module to an additional robot. Of course, the control module 630 generally undertakes similar considerations when determining how to assign the task modules to the additional robots as is done in relation to the robot 100. That is, the control module 630 considers capacity, operating capabilities, associated tasks, and so on. In this way, the control module 630 can assign the task modules to a team of multifunctional robots in order to achieve a cooperative arrangement of the robots to execute the treatment plan.

At 760, the control module 630 configures the robot 100 with the task module(s) according to the module layout. The control module 630 controls various components of the robot 100 to automatically install the task module(s) into available locations within the modular belly, thereby outfitting the multifunction robot 100 for performing at least one task in relation to the treatment plan. The process of configuring the robot 100 may involve multiple separate steps, including, for example, iteratively performing machine perception tasks to perceive a location of the robot relative to the task modules, locomotion of the robot 100 to a location of the task modules, and control of an articulated appendage (e.g., an arm) for lifting the task modules and inserting the task modules into place. Once the task modules are located within the modular belly of the robot 100, the control module 630 may initialize the task modules by, for example, powering the task modules, establishing communication with the task modules, executing functionality tests on the task modules, and so on. In this way, the management system 600 is able to dynamically and autonomously configure the robot 100 for the treatment plan.

At 770, the control module 630 dispatches the multifunction robot 100 to perform at least a portion of the treatment plan using the task module(s). The control module 630 dispatches the robot 100 by, for example, initiating the treatment plan within the robot 100 such that the robot 100 proceeds to the patient and begins executing an associated task. Consequently, the management system 600 functions to automatically configure the robot 100 for specific healthcare tasks, thereby improving operation of the robot in different contexts.

Figure 8:
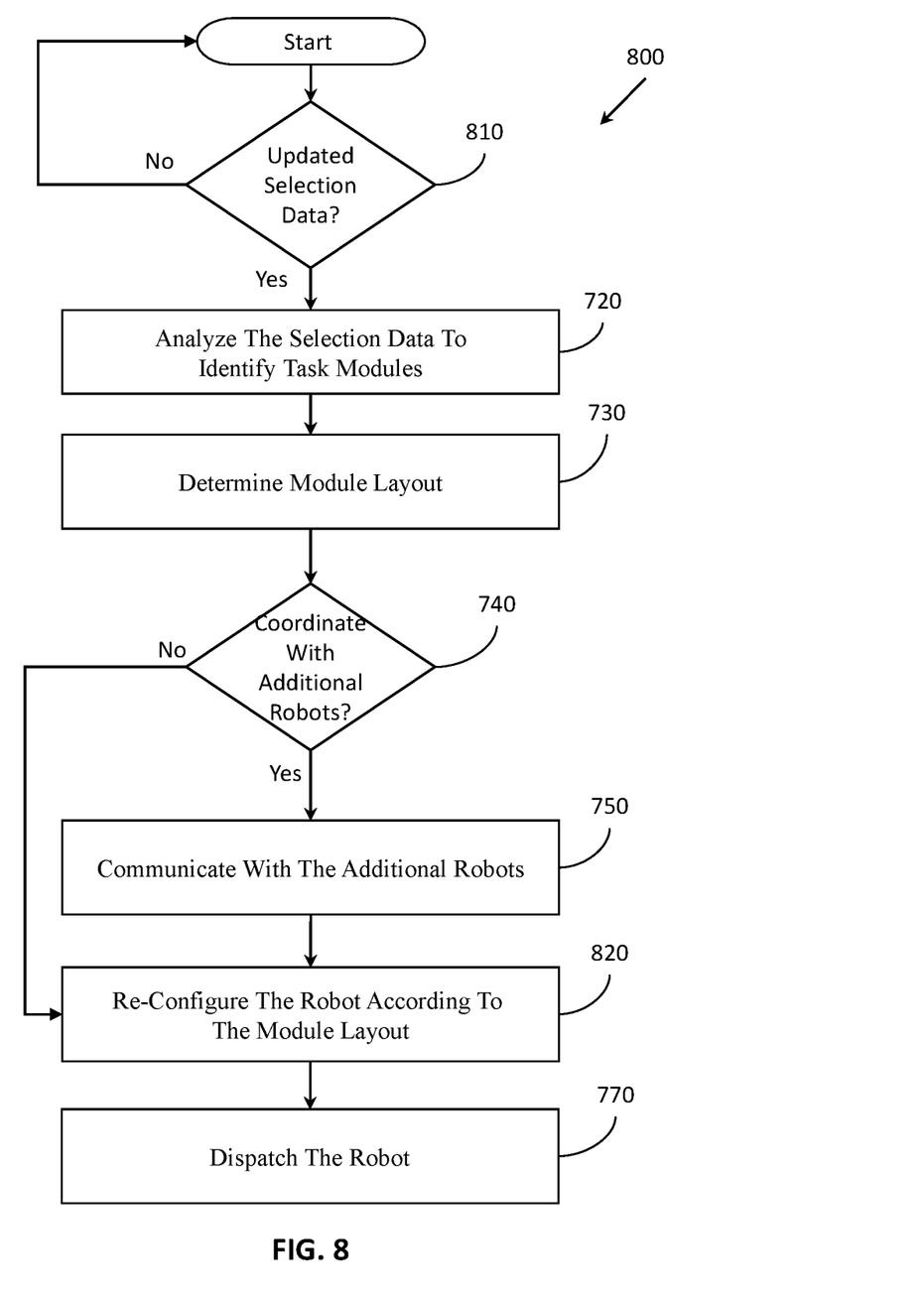
FIG. 8 is a flowchart illustrating one embodiment of a method associated with autonomously reconfiguring a multifunction robot.

FIG. 8 illustrates a flowchart of a method 800 that is associated with autonomous re-configuration of a multifunction robot. Many of the functions in method 800 are similar to functions in method 700. Therefore, similar functions have been numbered with the same labels and discussion of those functions will not be repeated for purposes of brevity. In any case, at 810, the control module 630 receives updated selection data 650. The updated selection data 650 is the same as the previous selection data 650, except that it is updated according to new observations of the patient. Because the condition of the patient changes as therapeutic agents are administered to the patient, the therapeutic agents (e.g., dosages, dosage forms, procedures, etc.) are generally adapted according to observed changes (e.g., biodistribution and pharmacokinetics etc.). Thus, at 810, the control module 630 receives the updated data 650 as part of iteratively receiving the selection data and analyzing the selection data changes occur. As such, the control module 630 proceeds with analyzing the selection data and determining the module layout as previously described at 720-750.

At 820, the control module 630 reconfigures the robot 100 according to the newly defined module layout to adapt the multifunction robot 100 to the treatment plan as the treatment plan changes in response to changes in a condition of the patient. Accordingly, whereas the control module 630 may simply insert the task modules and initiate the robot 100 when initially beginning treatment as discussed in relation to method 700, the control module 630 considers additional aspects in relation to method 800, such as which task modules are already present in the robot 100 and how to remove and insert new task modules at 820. In any case, the control module 630 adapts the robot 100 and proceeds with the updated treatment plan.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++, Python, or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A management system for autonomous configuration of a multifunction robot, comprising:
   one or more processors; and
   a memory communicably coupled to the one or more processors and storing instructions that, when executed by the one or more processors, cause the one or more processors to:
      responsive to receiving, in the multifunction robot, selection data that identifies a treatment plan for a patient, analyze the selection data to identify one or more task modules for carrying out the treatment plan;
      determine a module layout for the multifunction robot according to the one or more task modules for carrying out the treatment plan, including instructions to determine which of a set of available modules to acquire for use as the one or more task modules for implementing the treatment plan, wherein separate modules of the set of available modules are associated with different tasks, including tasks for at least monitoring, drug delivery, and surgery; and
      configure the robot with the one or more task modules from the set of available task modules according to the module layout, including instructions to automatically self-assemble the multifunction robot using the one or more task modules by installing the one or more task modules into one or more available locations within a belly of the multifunction robot.

2. The management system of claim 1, wherein the instructions to automatically self-assemble include instructions to control the multifunction robot to independently retrieve the one or more task modules and install the one or more task modules in the belly.

3. The management system of claim 1, wherein the instructions to receive the selection data include instructions to receive the selection data from a cloud-based system that generates the selection data according to an assessment of the patient that indicates one or more therapies as part of the treatment plan, the therapies including separate algorithms for performing the therapies.

4. The management system of claim 1, wherein the different tasks include distinct medical therapies for treating the patient.

5. The management system of claim 1, wherein the instructions to determine the module layout for the multifunction robot include instructions to determine how to populate available space within the multifunction robot to achieve the treatment plan, including instructions to communicate with one or more additional robots to conscript the one or more additional robots to assist in performing the treatment plan by allocating at least one task module from the set of available modules to the one or more additional robots.

6. The management system of claim 1, wherein the instructions to analyze the selection data include instructions to iteratively analyze the selection data as the selection data is received and reconfiguring the module layout to adapt the multifunction robot to the treatment plan as the treatment plan changes in response to changes in a condition of the patient.

7. The management system of claim 1, wherein the instructions include instructions to dispatch the multifunction robot to perform at least a portion of the treatment plan using the one or more task modules.

8. The management system of claim 1, wherein the management system is integrated with the multifunction robot that includes at least a plurality of sensors and movable arms for perceiving aspects of a surrounding environment and interacting with the surrounding environment.

9. A non-transitory computer-readable medium for autonomous configuration of a multifunction robot and storing instructions that, when executed by one or more processors, cause the one or more processors to:
   responsive to receiving, in the multifunction robot, selection data that identifies a treatment plan for a patient, analyze the selection data to identify one or more task modules for carrying out the treatment plan;
   determine a module layout for the multifunction robot according to the one or more task modules for carrying out the treatment plan, including instructions to determine which of a set of available modules to acquire for use as the one or more task modules for implementing the treatment plan, wherein separate modules of the set of available modules are associated with different tasks, including tasks for at least monitoring, drug delivery, and surgery; and
   configure the robot with the one or more task modules from the set of available task modules according to the module layout, including instructions to automatically self-assemble the multifunction robot using the one or more task modules by installing the one or more task modules into one or more available locations within a belly of the multifunction robot.

10. The non-transitory computer-readable medium of claim 9,
wherein the instructions to automatically self-assemble include instructions to control the multifunction robot to independently retrieve the one or more task modules and install the one or more task modules in the belly.

11. The non-transitory computer-readable medium of claim 9, wherein the instructions to receive the selection data include instructions to receive the selection data from a cloud-based system that generates the selection data according to an assessment of the patient that indicates one or more therapies as part of the treatment plan, the therapies including separate algorithms for performing the therapies.

12. The non-transitory computer-readable medium of claim 9, wherein the different tasks include distinct medical therapies for treating the patient.

13. The non-transitory computer-readable medium of claim 9, wherein the instructions to determine the module layout for the multifunction robot include instructions to determine how to populate available space within the multifunction robot to achieve the treatment plan, including instructions to communicate with one or more additional robots to conscript the one or more additional robots to assist in performing the treatment plan by allocating at least one task module from a set of available modules to the one or more additional robots.

14. A method for autonomous configuration of a multifunction robot, comprising:
responsive to receiving, in the multifunction robot, selection data that identifies a treatment plan for a patient, analyzing the selection data to identify one or more task modules for carrying out the treatment plan;
determining a module layout for the multifunction robot according to the one or more task modules for carrying out the treatment plan, including determining which of a set of available modules to acquire for use as the one or more task modules for implementing the treatment plan, wherein separate modules of the set of available modules are associated with different tasks, including tasks for at least monitoring, drug delivery, and surgery; and
configuring the robot with the one or more task modules from the set of available task modules according to the module layout, including automatically self-assembling the multifunction robot using the one or more task modules by installing the one or more task modules into one or more available locations within a belly of the multifunction robot.

15. The method of claim 14, wherein automatically self-assembling includes controlling the multifunction robot to independently retrieve the one or more task modules and install the one or more task modules in the belly.

16. The method of claim 14, wherein receiving the selection data includes receiving the selection data from a cloud-based system that generates the selection data according to an assessment of the patient that indicates one or more therapies as part of the treatment plan, the therapies including separate algorithms for performing the therapies.

17. The method of claim 14, wherein the different tasks include distinct medical therapies for treating the patient.

18. The method of claim 14, wherein determining the module layout for the multifunction robot includes determining how to populate available space within the multifunction robot to achieve the treatment plan, including communicating with one or more additional robots to conscript the one or more additional robots to assist in performing the treatment plan by allocating at least one task module from the set of available modules to the one or more additional robots.

19. The method of claim 14, wherein analyzing the selection data includes iteratively analyzing the selection data as the selection data is received and reconfiguring the module layout to adapt the multifunction robot to the treatment plan as the treatment plan changes in response to changes in a condition of the patient.

20. The method of claim 14, further comprising:
dispatching the multifunction robot to perform at least a portion of the treatment plan using the one or more task modules.

* * * * *